United States Patent Office 2,990,434
Patented June 27, 1961

2,990,434
POLYMERIZATION OF ACETYLENIC COMPOUNDS
William Roy Smith, Norton-on-Tees, England, assignor to Imperial Chemical Industries Limited, London, England, a corporation of Great Britain
No Drawing. Filed Oct. 29, 1956, Ser. No. 618,683
Claims priority, application Great Britain Nov. 8, 1955
7 Claims. (Cl. 260—673.5)

This invention relates to the polymerization of acetylenic compounds.

According to the invention there is provided a process for the polymerization of acetylenic compounds having the general formula $RC \equiv CR'$ where R is hydrogen or a univalent hydrocarbon radical and R' is a univalent hydrocarbon radical in which the acetylenic compound is brought into contact with a reaction medium comprising a material formed by reacting at least one organo-compound of at least one non-transition metal of groups 1, 2 and 3 of the periodic system with a compound of a transition metal both as hereinafter defined.

The univalent hydrocarbon radical of the acetylenic compound may be for example an alkyl, aryl or aralkyl group.

The process is applicable to the polymerization of a wide variety of acetylenic compounds exemplified by methyl acetylene, phenyl acetylene, dimethyl acetylene and diphenyl acetylene.

A non-transition metal is defined as a metal of one of the short periods of the periodic system or a metal of one of the long periods occupying one of the two places immediately following an inert gas or one of the seven places which immediately precede an inert gas. Examples of suitable non-transition metals are aluminium, beryllium, zinc, magnesium, lithium and sodium.

The organo-compound should contain at least one hydrocarbon radical attached to an atom of a non-transition metal, any remaining metal valences being satisfied by hydrogen or halogen atoms. Suitable hydrocarbon radicals include alkyl, alkenyl, alkynyl, cyclo-alkyl, aryl and aralkyl radicals of which alkyl is preferred.

Mixtures of organo-compounds may be employed. The organo-compound may also be used in the form of a complex compound with an alkali metal hydride, alkyl or aryl or in the form of a molecular compound with, for example, ethers, thio-ethers or amines. Particularly suitable organo-compounds are aluminium alkyls e.g. aluminium triethyl, or alkyl aluminium halides which may be produced by the processes of co-pending U.S. application Serial No. 481,039, now U.S. Patent No. 2,863,894. Other very suitable organo-compounds are complex alkyls of aluminium and an alkali metal e.g. sodium aluminium tetra-propyl, lithium aluminium tetra-ethyl, which may be prepared by the process of co-pending U.S. application Serial No. 469,037, now U.S. Patent No. 2,839,555. Suitable organo-compounds are alkali metal alkyls or aryls e.g. lithium propyl and sodium phenyl; zinc alkyls e.g. zinc di-ethyl; alkyl hydrides of group III metals e.g. aluminium ethyl dihydride, aluminium diethyl hydride; complex organo-compounds such as $NaAl(C_6H_5)_4$, $NaAl(C_2H_6)_3H$, $LiAl(C_3H_7)H_3$ and $$KAl(CH_3)_3F$$

The transition metal compound should be a compound of a transition metal of groups IV to VIII inclusive of the periodic system. Suitable compounds are halides, oxyhalides, complex halides such as complex fluorides, freshly precipitated oxides or hydroxides, alcoholates, acetates, benzoates and acetylacetonates of titanium, zirconium, hafnium, thorium, uranium, vanadium, niobium, tantalum, chromium, manganese, molybdenum and tungsten. Mixtures of the transition metal compounds may be used and these mixtures may be used with mixtures of the organo-compounds. I prefer that the transition metal compound is a halide such as for example, titanium tetrachloride, titanium tetrafluoride, vanadium tetrachloride, molybdenum pentachloride, and tungsten hexachloride. A particularly suitable halide is titanium tetrachloride.

The organo-compound and the transition metal compound may be reacted together in a wide range of molecular ratios. Very suitable molecular ratios are within the range 10:1 to 1:10. It is preferred that the molecular ratio is within the range 4:1 to 1:4.

By the process of the invention mono-substituted acetylenes can be converted into 1:2:4 and 1:3:5 trisubstituted benzenes and disubstituted acetylenes into hexasubstituted benzenes. The process is particularly valuable for the production of hexasubstituted benzenes.

Mixtures of acetylenic compounds may be submitted to the process of the invention. The acetylenic compound may be pure or in admixture with substances e.g. paraffinic hydrocarbons which are inert under the conditions of the process.

It is preferred to carry out the process in the presence of a solvent for the acetylenic compound which is inert under the reaction conditions. Suitable solvents are paraffinic, aromatic and alicyclic hydrocarbons such as butanes, pentanes, hexanes, cyclohexane, benzene and toluene. If the acetylenic compound is liquid under the conditions of the process it may be used as a solvent.

The acetylenic compound may be brought into contact with the reaction medium in a variety of ways. If under the conditions of temperature and pressure employed the acetylenic compound is a gas, it may for example, be passed across the surface of the medium or bubbled through the medium. If the acetylenic compound is a liquid under the conditions of operating the process it may be mixed with the medium, while if the acetylenic compound is a solid it may be brought into contact with the medium in the form of a solution in an inert solvent.

The process may be carried out at temperatures within a wide range. Temperatures within the range 50° to 100° C. are very convenient.

The pressure at which the process is operated may be atmospheric or higher or lower pressures. It is preferred to operate the process at about atmospheric pressure.

Water and oxygen should not be present in the apparatus in which the process is conducted in more than relatively small amounts since they decompose organo-compounds. Air is suitably displaced from the apparatus by a gas inert under the reaction conditions, for example, nitrogen.

The apparatus used in the following examples comprised a flask fitted with gas inlet and exit tubes, a dropping funnel and a stirrer. Air was displaced from the apparatus by an atmosphere of nitrogen.

*Example 1*

A reaction medium was prepared by adding 4.6 grams titanium tetrachloride to a solution of 5 grams aluminium triethyl in 200 ml. methyl cyclohexane contained in the flask. The flask was then evacuated, stirring commenced and a steady stream of methyl acetylene led into the flask so that it contacted the surface of the reaction medium. A reaction commenced immediately and after 2 hours 63.8 grams methyl acetylene had been absorbed and the temperature of the reaction mixture had risen to 63° C. At this stage the reaction mixture was cooled, 200 ml. methanol followed by 400 mls. 2 N hydrochloric acid slowly added and a trace of solid deposit removed by filtration. The filtrate was then separated into two layers and the hydrocarbon layer distilled under reduced pressure to give 40 grams of a fraction boiling 49° to 51° C. at 10 mm. Hg pressure which was shown by infra-red analysis to contain 60% 1:2:4 trimethyl benzene and 40% 1:3:5 trimethyl benzene. 5.1 grams of a tarry distillation residue was also obtained.

*Example 2*

A solution of 36 grams butyne-2 in 52 ml. methyl cyclohexane was added gradually over a periof of 1 hour to a flask containing a stirred mixture of 3.8 grams aluminium triethyl and 3.5 grams titanium tetrachloride in 100 ml. methyl cyclohexane under an atmosphere of dry nitrogen. The temperature of the reaction mixture rose rapidly to 70° C. which temperature was maintained throughout the period of addition of the butyne-2 solution.

After the addition of the butyne-2 solution was completed the reaction mixture was treated successively with 50 ml. methanol and 100 ml. dilute hydrochloric acid, the aqueous layer separated from the hydrocarbon layer and extracted repeatedly with cyclohexane until the extract was colourless. The cyclohexane extract was then mixed with the hydrocarbon layer, dried over anhydrous magnesium sulphate and evaporated to crystallisation. 26 grams of crystalline hexamethylbenzene were obtained which on recrystallisation from alcohol melted at 162° to 163° C. and did not depress the melting point of an authentic sample of hexamethylbenzene.

*Example 3*

A solution of 20 grams diphenyl acetylene in 100 ml. methyl cyclohexane was added gradually over a period of 30 minutes to a flask containing a stirred mixture of 4.5 grams aluminium triethyl and 4.0 grams titanium tetrachloride in 100 ml. methyl cyclohexane under an atmosphere of dry nitrogen. After the addition of the diphenyl acetylene was completed the reaction mixture was heated at 70° to 80° C. for 30 minutes, and then treated successively with methanol and dilute hydrochloric acid. 16.8 grams of solid hexaphenylbenzene, melting point about 420° C., were thus obtained which crystallised in white prisms from chloroform and xylene. Analysis of the crystalline product showed 94.4% carbon and 5.7% hydrogen (hexaphenylbenzene $C_{42}H_{30}$ contains 94.4% carbon, 5.6% hydrogen).

I claim:
1. A process for the synthesis of a hexa-substituted benzene compound, selected from the group consisting of alkyl-, and aryl-hydrocarbon-hexa-substituted benzene, which comprises polymerizing, in the liquid phase at a temperature from about 50° C. to about 100° C., an acetylenic compound having the formula R—C=C—R', wherein R and R' are selected from the group consisting of alkyl and aryl, in the presence of a catalyst composed of the reaction product of (1) an organo-compound of a non-transition metal selected from the group consisting of groups 1, 2, and 3 of the periodic table and wherein the organo-radical is a lower molecular weight hydrocarbon and (2) titanium tetrachloride.

2. The process of claim 1 wherein the molecular ratio of said aluminum alkyl to said titanium tetrachloride is within the range of from 4:1 to 1:4.

3. The process of claim 2 further defined by maintaining a pressure at about atmospheric pressure.

4. The process of claim 1, wherein said organo-compound is aluminum alkyl.

5. The process of claim 1, wherein said liquid phase includes an inert solvent.

6. A process for the synthesis of hexamethylbenzene from reactants consisting essentially of butyne-2 which comprises contacting said acetylenic compounds, in the liquid phase at a temperature between about 50° C. and 100° C., with a catalyst produced by reacting (1) a metal-organo compound wherein the metal is a non-transition metal selected from the group consisting of groups 1, 2, and 3 of the periodic table and the organo radical is a lower molecular weight hydrocarbon and (2) titanium tetrachloride.

7. A process for the synthesis of hexaphenylbenzene from reactants consisting essentially of diphenylacetylene which comprises contacting said acetylenic compounds, in the liquid phase at a temperature between about 50° C. and 100° C., with a catalyst produced by reacting (1) a metal-organo compound wherein the metal is a non-transition metal selected from the group consisting of groups 1, 2, and 3 of the periodic table and the organo radical is a lower molecular weight hydrocarbon and (2) titanium tetrachloride.

References Cited in the file of this patent

UNITED STATES PATENTS

| | | |
|---|---|---|
| 2,721,189 | Anderson | Oct. 18, 1955 |
| 2,781,408 | Witt | Feb. 12, 1957 |
| 2,819,325 | Lanning et al. | Jan. 7, 1958 |

FOREIGN PATENTS

| | | |
|---|---|---|
| 530,753 | Italy | July 15, 1955 |
| 538,782 | Belgium | Dec. 6, 1955 |
| 1,149,218 | France | July 8, 1957 |

OTHER REFERENCES

Dykstra: Jour. Amer. Chem. Soc., vol. 72, 1934, pages 1625–1628.

"Bolettino dei Brevetti per Invenzioni, Modelli e Marchi"; July 1955; published by Ministero dell' Industria e del Commercio, Ufficio Centrale dei Brevetti per Invenzioni, Modelli e Marchi, Rome, Italy, page 2639.